(12) United States Patent
Scarlata et al.

(10) Patent No.: US 7,590,867 B2
(45) Date of Patent: Sep. 15, 2009

(54) METHOD AND APPARATUS FOR PROVIDING SECURE VIRTUALIZATION OF A TRUSTED PLATFORM MODULE

(75) Inventors: Vincent R. Scarlata, Hillsboro, OR (US); Carlos V. Rozas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 860 days.

(21) Appl. No.: 10/876,994

(22) Filed: Jun. 24, 2004

(65) Prior Publication Data

US 2006/0020781 A1    Jan. 26, 2006

(51) Int. Cl.
G06F 12/14    (2006.01)

(52) U.S. Cl. ..................................................... 713/193
(58) Field of Classification Search ........................ None
See application file for complete search history.

(56) References Cited

U.S. PATENT DOCUMENTS

| 7,076,655 | B2 |  | 7/2006 | Griffin et al. |  |
|---|---|---|---|---|---|
| 7,222,062 | B2 | * | 5/2007 | Goud et al. | 703/23 |
| 7,313,679 | B2 | * | 12/2007 | Ranganathan | 713/1 |
| 7,444,512 | B2 | * | 10/2008 | Brickell | 713/168 |
| 2002/0193615 | A1 |  | 12/2002 | Aksela et al. |  |
| 2002/0194482 | A1 |  | 12/2002 | Griffin et al. |  |
| 2003/0115453 | A1 | * | 6/2003 | Grawrock | 713/155 |
| 2003/0163711 | A1 | * | 8/2003 | Grawrock | 713/189 |
| 2003/0226031 | A1 | * | 12/2003 | Proudler et al. | 713/200 |
| 2004/0264797 | A1 |  | 12/2004 | Lippincott et al. |  |
| 2005/0132122 | A1 |  | 6/2005 | Rozas |  |
| 2005/0210467 | A1 | * | 9/2005 | Zimmer et al. | 718/1 |
| 2005/0246552 | A1 | * | 11/2005 | Bade et al. | 713/193 |
| 2005/0286792 | A1 |  | 12/2005 | Tadas et al. |  |
| 2006/0002471 | A1 |  | 1/2006 | Lippincott et al. |  |
| 2006/0010079 | A1 | * | 1/2006 | Brickell | 705/67 |
| 2006/0020781 | A1 |  | 1/2006 | Scarlata et al. |  |
| 2006/0140501 | A1 |  | 6/2006 | Tadas |  |
| 2006/0230401 | A1 |  | 10/2006 | Grawrock |  |
| 2006/0256105 | A1 |  | 11/2006 | Scarlata et al. |  |
| 2006/0256106 | A1 |  | 11/2006 | Scarlata et al. |  |

(Continued)

FOREIGN PATENT DOCUMENTS

WO    WO 02/06929 A2    1/2002

(Continued)

OTHER PUBLICATIONS

N. Sumrall et al., Trusted Computing Group (TCG) and the TPM 1.2 Specification, Intel Developer Forum.

(Continued)

Primary Examiner—Matthew B Smithers
Assistant Examiner—David J Pearson
(74) Attorney, Agent, or Firm—Trop, Pruner & Hu, P.C.

(57) ABSTRACT

A method and a related apparatus provide a virtual trusted platform module (TPM). In an example embodiment, a virtual TPM service creates a virtual TPM for use in a processing system that contains a physical TPM. The virtual TPM service may store a key for the virtual TPM in the physical TPM. The virtual TPM service may then use the virtual TPM to provide emulated physical TPM features. In one embodiment, the virtual TPM service may use the virtual TPM to emulate a physical TPM for a virtual machine in the processing system. Other embodiments are described and claimed.

21 Claims, 4 Drawing Sheets

U.S. PATENT DOCUMENTS

| | | | |
|---|---|---|---|
| 2006/0256107 A1 | 11/2006 | Scarlata et al. | |
| 2006/0256108 A1 | 11/2006 | Scaralata | |
| 2007/0043896 A1 | 2/2007 | Daruwala et al. | |
| 2007/0094719 A1 | 4/2007 | Scarlata | |

OTHER PUBLICATIONS

C. Powel et al., "Foundations for Trusted Computing", Infineon Technologies, Nov. 7, 2002, London, England.

Trusted Computing Platform Alliance (TCPA), Main Specification Version 1.1b, Trusted Computing Group, 2003.

TPM Main, Part 1: Design Principles, Specification Version 1.2, Revision 62, Trusted Computing Group, Oct. 2, 2003.

Mario Strasser, "A Software-Based TPM Emulator for Linux",*Semester Thesis, Eidgenssische Technische Hochschule Zurich*, Jul. 2004, pp. 1-50, Zurich, Switzerland.

Tal Garfinkel et al., "Terra: A Virtual Machine-Based Platform for Trusted Computing",*Computer Science Department, Stanford University*Oct. 19, 2003, pp. 193-206.

PCT International Search Report mailed Sep. 5, 2005.

The Patent Office of the State Intellectual Property Office of the People's Republic of China, Office Action dated Jan. 9, 2009 in a related patent application.

The Patent Office of the State Intellectual Property Office of the People's Republic of China, Office Action dated Apr. 25, 2008 in a related patent application.

TCG Published, "TPM Main Part 1 Design Principles," Specification Version 1.2, Revision 62, Oct. 2, 2003, pp. 23 and 26.

Petroni et al., "Copilot—a Coprocessor-based Kernal Runtime Integrity Monitor", Proceedings of the 13th USENIX Security Symposium, San Diego, CA, Aug. 9-13, 2004, 17 pgs.

Carlos Rozas et al., "Methods and Apparatus for Remeasuring a Virtual Machine Monitor", U.S. Appl. No. 11/648,103, filed Dec. 29, 2006.

Reiner Sailer et al., "Design and Implementation of a TCG-based Integrity Measurements Architecture", Proceedings of the 13th USENIX Security Symposium, San Diego, CA, Aug. 9-13, 2004, 20 pgs.

John Marchesini et al., "Experimenting with TCPA/TCG Hardware, Or: How I Learned to Stop Worrying and Love The Bear", Computer Science Tech Report TR2003-476, Dept. of Computer Science, Dartmouth PKI Lab Dartmouth College, Hanover, New Hampshire, Version of Dec. 15, 2003, 22 pgs.

Carlos Rozas et al., "Dynamic Measurement of an Operating System in a Virtualized System", U.S. Appl. No. 11/513,963, filed Aug. 31, 2006.

Michael M. Swift et al., "Improving the Reliability of Commodity Operating Systems", Proceedings of the 13th USENIX Security Symposium, San Diego, CA, Aug. 9-13, 2004, 18 pgs.

Intel Corp., "Intel Trusted Execution Technology", Preliminary Architecture Specification, Nov. 2006, 104 pgs.

Ahmad-Reza Sadeghi et al., "Property-based Attestation for Computing Platforms: Caring about properties, not mechanisms", 2004, pp. 67-77.

George W. Dunlap et al., "ReVirt: Enabling Intrusion Analysis through Virtual-Machine Logging and Replay", Proceedings of the 2002 Symposium on Operating Systes Design and Implementation (OSDI), Dept. of Electrical Engineering and Computer Science, Univ. of Michigan, 14 pgs.

Keir Fraser et al., "Safe Hardware Access with the Xen Virtual Machine Monitor", 2004, 12 pgs. http://www.cl.cam.ac.uk/Research/SRG/netos/papers/2004-oasis-ngio.pdf.

Robert Meushaw et al., Tech Trend Notes, "NetTop—Commercial Technology in High Assurance Applications", Fall 2000, vol. 9, Edition 4, 12 pgs.

Tal Garfinkel et al., "TERRA—A virtual machine-based platform for trusted computing", (Presentation), Nov. 10, 2004, 26 pgs. http://www.stanford.edu/~talg/papers/SOSP03/terra.pdf.

David Grawrock et al., "The Intel Safer Computing Initiative", Jan. 2006, 282 pgs.

David Safford, "The Need for TCPA", IBM Research, Oct. 2002, 10 pgs., http://www.research.ibm.com/gsal/tcpa/why_tcpa.pdf.

TPM Main, Part 1: Design Principles, Specification Version 1.2, Revision 94, Mar. 29, 2006, Trusted Computing Group, TCG Published 2003-2006, 180 pgs.

Paul Barham et al., "Xen and the Art of Virtualization", SOSP '03, Oct. 19-22, 2003, Bolton Landing, NY, 16 pgs.

http://www.trustedcomputinggroup.org/home—"What is the Trusted Computing Group", (internet home page), 2 pgs, 2005.

Stefan Berger et al., "vTPM: Virtualizing the Trusted Platform Module", Security '06: 15th USENIX Security Symposium, pp. 305-320, 2006.

Applied Data Security Group, "Trusted GRUB", 3 pgs. http://www.prosec.rub.de/trusted_grub.html, Retrieved Jun. 28, 2005.

VMWARE, "VMware Reinvents Enterprise Desktop Management and Security with Breakthrough New Product", 4 pgs. http://www.vmware.com/news/release/ace_announce.html, Retrieved Jun. 28, 2005.

* cited by examiner

METHOD AND APPARATUS FOR PROVIDING SECURE VIRTUALIZATION OF A TRUSTED PLATFORM MODULE

FIELD OF THE INVENTION

The present disclosure relates generally to the field of data processing, and more particularly to a method and related apparatuses for providing secure virtualization of a trusted platform module.

BACKGROUND

A conventional processing system may include hardware resources, such as a central processing unit (CPU) and random access memory (RAM), as well as software resources, such as an operating system (OS) and one or more end-user programs or applications. An application is typically developed to run on a particular OS. When a typical conventional computer system is started, it loads the OS before loading the end-user programs or applications. The OS typically serves as an intermediary between software applications and the hardware in a processing system.

In addition to RAM and one or more CPUs, a processing system may include a trusted platform module (TPM). A TPM is a hardware component that resides within a processing system and provides various facilities and services for enhancing the security of the processing system. For example, a TPM may be used to protect data and to attest to the configuration of a platform. The sub-components of a TPM may include an execution engine and secure non-volatile (NV) memory or storage. The secure NV memory is used to store sensitive information, such as encryption keys, and the execution engine protects the sensitive information according to the security policies to be implemented by the TPM.

A TPM may be implemented in accordance with specifications such as the Trusted Computing Group (TCG) TPM Specification Version 1.2, dated Oct. 2, 2003 (hereinafter the "TPM specification"), which includes parts such as Design Principles, Structures of the TPM, and TPM Commands. The TPM specification is published by the TCG and is available from the Internet at www.trustedcomputinggroup.org/home.

In general, a TCG-compliant TPM provides security services such as attesting to the identity and/or integrity of the platform, based on characteristics of the platform. The platform characteristics typically considered by a TPM include hardware components of the platform, such as the processor(s) and chipset, as well as the software residing in the platform, such as the firmware and OS. A TPM may also support auditing and logging of software processes, as well as verification of platform boot integrity, file integrity, and software licensing. It may therefore be said that a TPM provides a root of trust for a platform. Accordingly, a third party may implement security policies which require requesting systems to provide TPM-based platform attestation. For instance, the third party may configure a server to deny client requests unless those requests are accompanied by valid, TPM-based platform attestation from the client systems.

When a conventional processing system uses a TPM, however, that processing system may be able to support only one software environment at a time.

Recently, Intel Corporation began developing technology for providing multiple independent software environments inside a single processing system. For instance, technology developed by Intel Corporation includes features for partitioning and managing a processing system's hardware resources in a way that allows multiple OSs to execute on the same machine concurrently, with each OS operating substantially as if it were in its own independent physical machine. In such a processing system, each OS may operate within a substantially independent software environment. Such independent environments may be referred to as partitions or virtual machines (VMs).

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

A virtual TPM (vTPM) is a logical device that provides TPM-like functionality. The present disclosure describes one or more example embodiments of systems, methods, and apparatuses for providing virtual TPMs.

Figure 1:
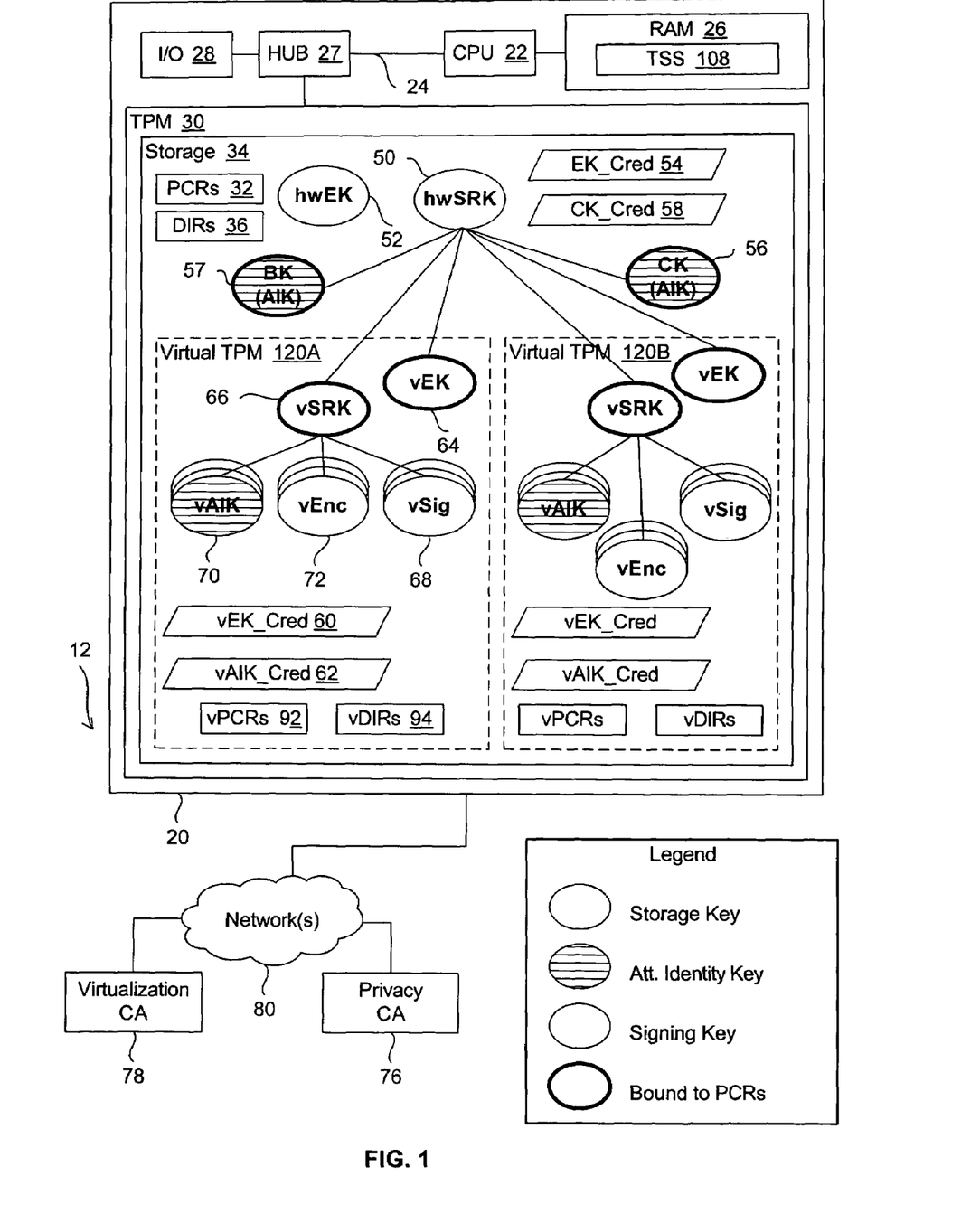
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that includes one or more processors or central processing units (CPUs) 22 communicatively coupled to various other components via one or more system buses 24 or other communication pathways or mediums.

As used herein, the terms "processing system" and "data processing system" are intended to broadly encompass a single machine, or a system of communicatively coupled machines or devices operating together. Exemplary processing systems include, without limitation, distributed computing systems, supercomputers, high-performance computing systems, computing clusters, mainframe computers, minicomputers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Processing system 20 may be controlled, at least in part, by input from conventional input devices, such as keyboards, mice, etc., and/or by directives received from another machine, interaction with a virtual reality (VR) environment, biometric feedback, or other input sources or signals. Processing system 20 may utilize one or more connections to one or more remote data processing systems 76, 78, such as through a network controller, a modem, or another communicative coupling. Processing systems may be interconnected by way of a physical and/or logical network 80, such as a local area network (LAN), a wide area network (WAN), an intranet, the Internet, etc. Communications involving network 80 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Within processing system 20, processor 22 may be communicatively coupled to one or more volatile or non-volatile data storage devices, such as random access memory (RAM) 26, read-only memory (ROM), mass storage devices such as integrated drive electronics (IDE) hard drives, and/or other devices or media, such as floppy disks, optical storage, tapes, flash memory, memory sticks, digital video disks, biological storage, etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as video controllers, small computer system interface (SCSI) controllers, network controllers, universal serial bus (USB) controllers, input devices such as a keyboard and mouse, etc. Processing system 20 may also include one or more bridges or hubs 27, such as a memory controller hub, an input/output (I/O) controller hub, a PCI root bridge, etc., for communicatively coupling various system components.

Some components, such as a network controller for example, may be implemented as adapter cards with interfaces, such as a PCI connector, for communicating with PCI bus. In one embodiment, one or more devices may be implemented as embedded controllers, using components such as programmable or non-programmable logic devices or arrays, application-specific integrated circuits (ASICs), embedded computers, smart cards, and the like.

As illustrated, processing system 20 also includes a TPM 30 communicatively coupled to processor 24. TPM 30 may also be referred to as a physical TPM or hardware TPM (hwTPM) 30. In one embodiment, TPM 30 is implemented as an embedded device, residing on a system motherboard or backplane of processing system 20. TPM 30 includes several storage facilities, including volatile platform configuration registers (PCRs) 32 and authorization sessions, as well as persistent data integrity registers (DIRs) 36, authorization digests, and general use persistent storage. Each of these facilities may have a corresponding in-memory data structure.

The invention may be described by reference to or in conjunction with associated data including instructions, functions, procedures, data structures, application programs, etc. which, when accessed by a machine, result in the machine performing tasks or defining abstract data types or low-level hardware contexts. The data may be stored in volatile and/or non-volatile data storage.

For instance, RAM 26 may include one or more collections or groups of instructions for providing secure virtualization of a TPM. In the example embodiment, those instructions may implement a virtual TPM service 104, which may reside partially or completely within a virtual machine monitor (VMM) 106 (see FIG. 2). Processing system 20 may load VMM 106 into RAM 26 at boot time to support one or more virtual machines within processing system 20. Processing system 20 may load the instructions that implement VMM 106 from ROM and/or from one or more local or remote mass storage devices, for instance. If any additional instructions are used to support secure virtualization of a TPM, those instructions may also be loaded from ROM and/or from one or more local or remote mass storage devices, for instance.

Figure 2:
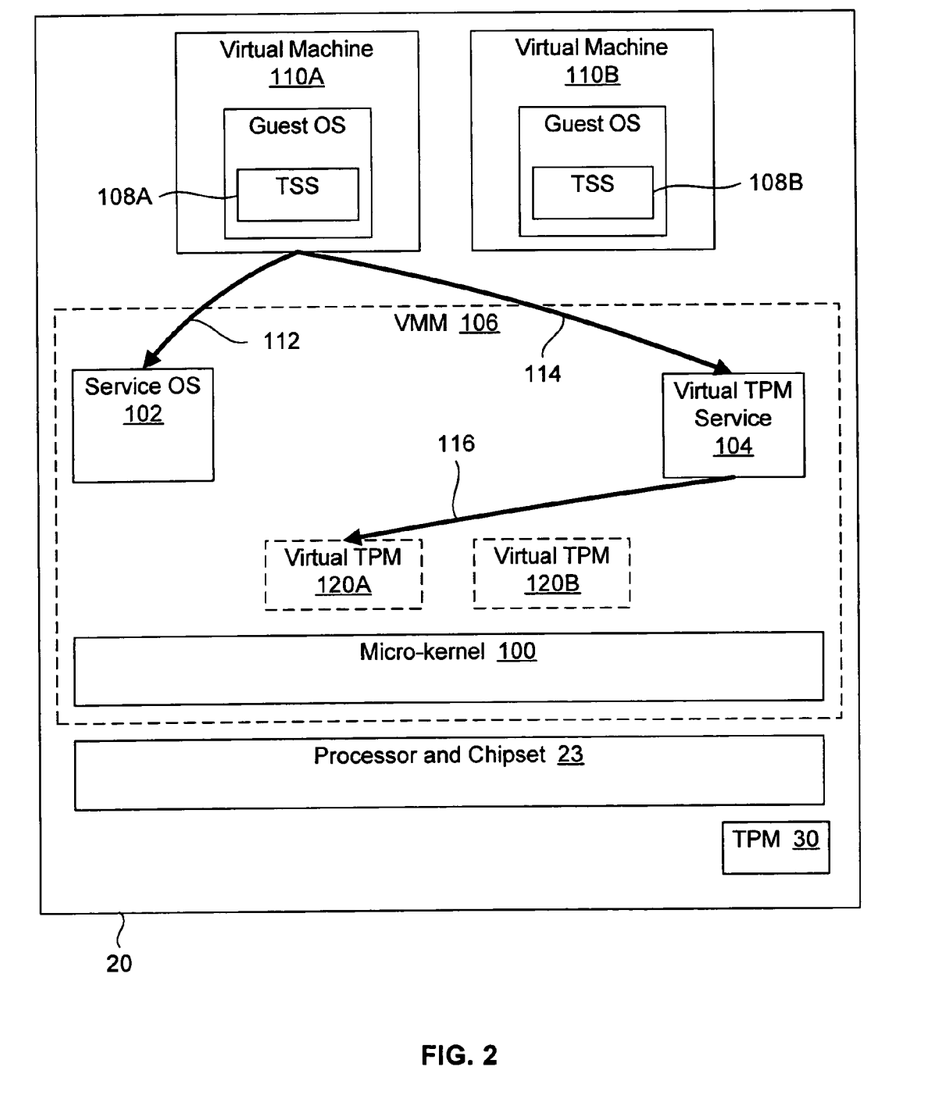
FIG. 2 is a block diagram depicting a suitable virtual machine architecture according to an example embodiment of the present invention.

FIG. 2 is a block diagram depicting an example virtual machine architecture involving VMM 106 within processing system 20. At the lowest level are TPM 30 and other hardware components, such as processor 24, hub 27, etc. (illustrated individually in FIG. 1: identified collectively as processor and chipset 23 in FIG. 2). In operation, processing system 20 also includes VMM 106, implemented through execution of software or firmware components such as a micro-kernel 100 and a service OS 102. Micro-kernel 100 may include a small nucleus of instructions for system management tasks such as instruction scheduling. Service 05 102 may include device drivers and environment virtualization software for creating and maintaining virtual machines.

In the example embodiment, VMM 106 also includes a virtual TPM service 104 for creating and maintaining vTPMs. Virtual TPM service 104 may also provide virtual machines with access to respective vTPMs. Although software modules such as virtual TPM service 104 reside within VMM 106 in the example embodiment, in alternative embodiments those modules may reside in the firmware or any other protected environment.

Virtual TPM services may be provided for a wide variety of VMM architectures. In some embodiments, it is not necessary to embed a virtual TPM service into a VMM. Furthermore, in some embodiments, the virtual TPM service may not be part of a VMM at all.

In the example embodiment, virtual TPM service 104 resides in protected host memory. For example, processing system 20 may use technology such as that described in U.S. Pat. Nos. 6,507,904; 6,633,963; and 6,678,825 (all assigned to Intel Corporation) to load TPM service 104 into, and execute TPM service 104 from, an isolated area of memory that is protected by hardware. In the example embodiment, the protected memory ensures that the software/instructions can run without interference or observation. In alternative embodiments, other techniques may be used to provide protected memory. For instance, an environment may include a system management mode (SMM) that provides protected memory, or a protected execution environment could be created using a tamper-resistant software compiler. Other components (e.g., VMM 106, microkernel 100, virtual TPMs 120A and 120B, etc.) may also reside in protected memory.

In the example embodiment, VMM 106 supports multiple virtual machines 110A and 110B, each running its own independent guest OS, and its own independent trusted software stack or TCG software stack (TSS) 108A, 108B. In the example embodiment, TSSs 108A and 108B comply with TCG standards.

As described in greater detail below, virtual TPM service 104 may use TPM 30 to provide distinct virtual TPMs 120A and 120B for virtual machines 110A and 110B, respectively.

The bold arrows in FIG. 2 represent virtualization events (VEs). For example, arrow 112 represents a VE involving transfer of control from VM 110A to service OS 102. Arrow 114 represents a VE triggered when VM 110A attempts to access a TPM. As illustrated, virtual TPM service 104 intercepts the VE to process the event by reference to vTPM 120A, as indicated by arrow 116. In the example embodiment, although VM 110A may be unaware of any TPM other than vTPM 120A, virtual TPM service 104 may use hwTPM 30 to support vTPM 120A.

In the example embodiment, each vTPM has its own TPM structures, including an endorsement key (EK), a storage root key (SRK), an endorsement credential (EK credential), a user key hierarchy, platform configuration registers (PCRs), monotonic counters, internal persistent storage, data integrity registers (DIRs), etc. Referring again to FIG. 1, as indicated by the legend in the lower right corner, storage keys are illustrated as ovals with no fill, attestation identity keys (AIKs) are illustrated as ovals filled with horizontal lines, and signing keys are illustrated as ovals filled with a pattern of dots. In addition, bolded ovals represent keys that are bound to PCRs 32 of TPM 30. Lines between keys indicate parent/child relationships among the keys. For example, those lines indicate that SRK 50 is a parent key for certain hardware keys within TPM 30, as well as certain virtual keys within each vTPM. Credentials are represented by parallelograms.

The virtual keys and other structures or objects within a vTPM may have the same structure as hardware TPM keys or objects, but the virtual objects within a virtual TPM are not mere references to the standard objects within TPM 30, such as EK 52, SRK 50, and PCRs 32. Instead, as described in greater detail below, each virtual TPM gets its own distinct objects, such as a virtual EK (vEK) 64, a virtual SRK (vSRK) 66, virtual PCRs (vPCRs) 92, and virtual DIRs (vDIRs) 94. Those virtual objects may be based on or derived from the objects of the hardware TPM. For example, in the example embodiment, the virtual SRKs and virtual EKs are children of the hardware SRK or, in the case of nested vTPMs, a virtual SRK ultimately based on the hardware SRK. By allowing for vTPM keys to be rooted in vSRKs, this model allows for vTPM nesting.

Virtual TPM objects such as vEK 64, vSRK 66, and vPCRs 92 may in turn serve as the basis for additional virtual objects within vTPM 120A, such as virtual signing keys (vSigs) 68, virtual AIKs (vAIKs) 70, and virtual storage/encryption keys (vEncs) 72. In the example embodiment, each vTPM provides all of the functions provided by a hardware TPM (hwTPM), with the same application program interfaces (APIs). Each vTPM 120A thus Drovides emulated Dhvsical TPM features. For example, vTPM 120A may include its own vDlRs 94, vPCRs 92, vAIKs 70, etc. Consequently, the guest OS in each VM may be completely unaware that the corresponding vTPM is not a hwTPM. The VMs may therefore use legacy OS code. In addition, according to the example embodiment, a processing system with a conventional hwTPM may be configured to provide vTPMs without requiring any modifications to the hwTPM.

Virtual PCRs such as vPCRs 92 do not have the resource constraints of hwTPMs, but instead may have a configurable number of PCRs available to them. In the example embodiment, vPCRs 92 are stored in the memory space of vTPM 120A, and vTPM 120A emulates the standard PCR operations on vPCRs 92 such as read and extend operations.

In the example embodiment, vTPM 120A uses software to provide simulated, persistent, monotonic counters. The number of counters may be substantially unlimited. In the example embodiment, vTPM 120A at least provides the four counters expected from hwTPMs. The vTPM counters may not require any direct link to the hardware TPM counters.

The virtual machine architecture may utilize the hardware TPM to protect the virtual keys and related data. In one embodiment, the vTPM key hierarchies and related data are protected within a standard hwTPM. For example, the virtual TPM keys may be stored in, and never released from, the hardware TPM, unless the data is first encrypted by vTPM 120A, as describe below. Consequently, if a virtual TPM is compromised, the public portions of the associated vTPM keys may possibly be subject to unauthorized use, but only for the duration of the compromise. In the example embodiment, all keys will remain inside the hardware TPM, and the private keys therefore cannot be stolen or used once the compromise has ended.

A processing system according to the present invention may also provide an attestation protocol architecture that allows vTPMs to provide conventional TPM attestation services. Remote challengers with no awareness of virtual TPMs may participate fully in the attestation process. Moreover, remote challengers with vTPM awareness may be capable, without additional protocols, of distinguishing hwTPMs from vTPMs, and may then decide whether or not to trust a platform hosting a vTPM.

In the example embodiment, when a virtual TPM (vTPM) is not operational, persistent data structures for that vTPM are stored on disk and sealed to the vTPM service's PCRs with the parent SRK. Thus, TPM 30 protects the vTPM even when the vTPM is not running.

In the example embodiment, vTPM 120A is able to transparently provide TPM functionality both from itself and from the hwTPM under a single user authorization session. The vTPM 120A accomplishes this objective by maintaining separate authorization sessions with both the user and the hwTPM. That is, the user will create an authorization session with vTPM 120A as if vTPM were a hwTPM. The vTPM 120A may complete all the same authorization checks based on this session that a hwTPM would do. If vTPM 120A can provide a requested function directly, vTPM 120A may simply update the session nonces and reply back. If vTPM 120A needs the hardwareTPM to provide the service, vTPM 120A will create an authorization session or reuse an existing authorization session with the hwTPM to make the request. Once vTPM 120A is done using the hwTPM, vTPM 120A may update the nonces on the user's session and reply back.

Figure 3:
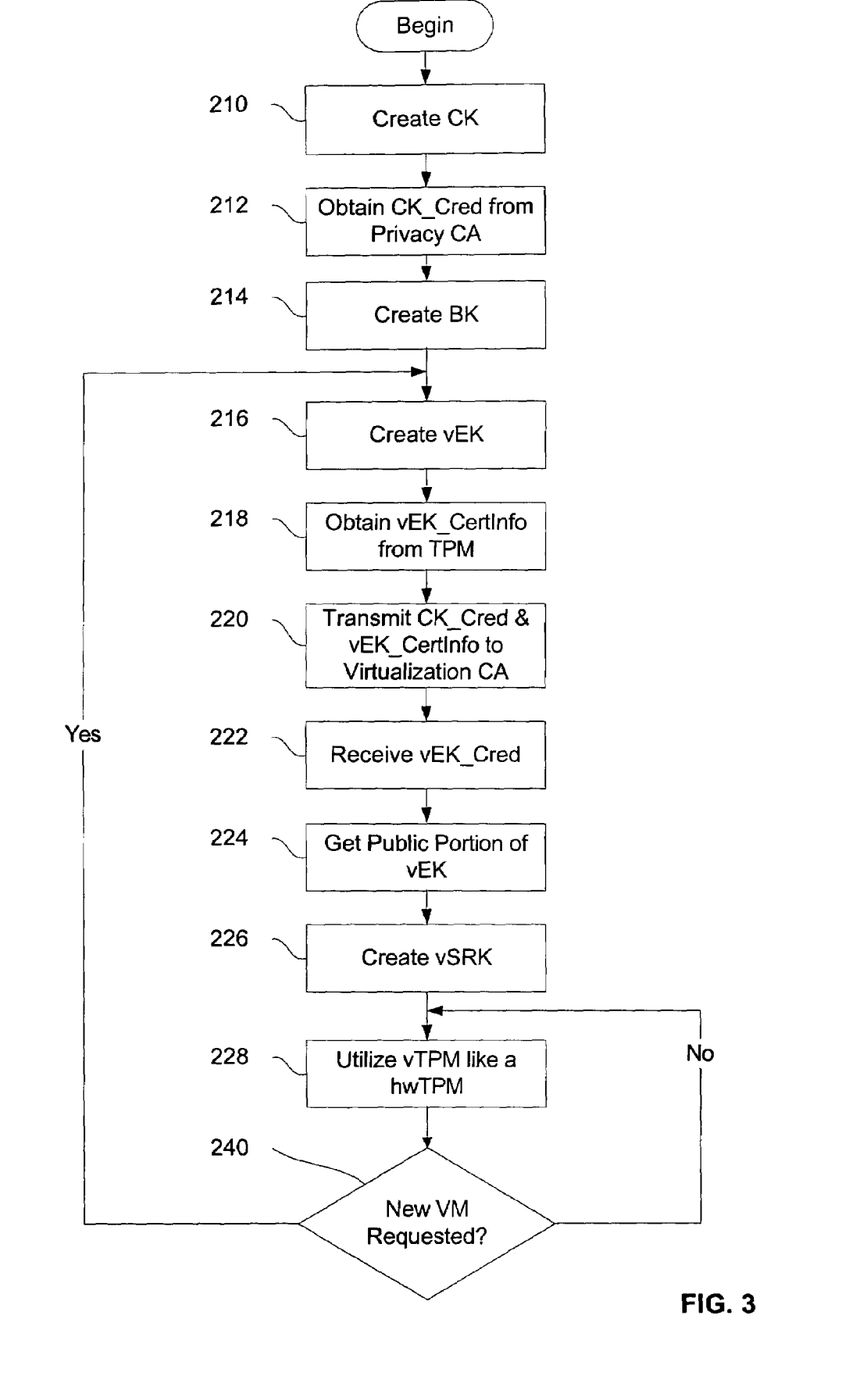
FIG. 3 is a flowchart illustrating a process for providing a virtual TPM, in accordance with one embodiment of the present invention.

FIG. 3 is a flowchart illustrating a process for providing a virtual TPM, in accordance with one embodiment of the present invention. The process of FIG. 3 starts after TPM 30 has been activated in processing system 20, such that, like a conventional TPM, TPM 30 includes an SRK 50, an EK 52, and standard credentials such as an EK credential 54, as illustrated in FIG. 1. At blocks 210-214, VMM 106 performs several operations to initialize virtual TPM service 104, in preparation for supporting virtual TPMs. For example, at block 210, VMM 106 creates an AIK called the certifying key (CK) 56. VMM 106 may use a standard process for creating AIKs to create CK 56. Virtual TPM service 104 may subsequently use CK 56 when certifying virtual endorsements keys such as vEK 64. At block 212, virtual TPM service 104 obtains a credential 58 for CK 56 from a third party or trusted third party (TTP), such as a privacy certification authority (CA) 76. CK credential 58 is signed by privacy CA 76 and vouches for CK 56, indicating that CK 56 is protected by a valid TPM.

At block 214, VMM 106 creates an AIK called a binding key (BK) 57. BK 57 may be used later to protect vTPM data when that data is released from vTPM service 104. For instance, in the example embodiment, vTPM 120A preserves persistent data similarly to how the hwTPM stores persistent keys and registers. However, to protect data being released, vTPM 120A binds the following to BK 57: key blobs wrapped by vEK 64, key blobs wrapped by vSRK 66, authorization data for vEK 64, authorization data for vSRK 66, vDIRs 94, and wrapped key blobs for persistent keys which are loaded.

For vTPM 120A, the logical equivalent of bus controllers for implementing locality is VMM 106. Thus, vTPM 120A will operate in whatever locality VMM 106 instructs it to. VMM 106 may use any appropriate technique to change the current locality of vTPM 120A as necessary.

Once VMM 106 has initialized virtual TPM service 104, virtual TPM service 104 may create virtual TPMs upon demand.

In the example embodiment, once initialized, each virtual TPM is capable of operating and supporting traditional functions such as attestation as if the virtual TPM were a hardware TPM. To allow the virtual TPM to operate in this manner, the virtual TPM is provided with the same kind of credentials that a hardware TPM is expected to have. For example, as described in greater detail below, in one embodiment, for each new vTPM, virtual TPM service 104 creates or obtains a new vEK, a new virtual SRK (vSRK), and credentials for the vEK. The vEK credentials indicate that the vEK is safely stored in accordance with TPM specifications. In addition, a platform credential and a conformance credential may be provided by the virtual TPM software vendor.

In the example embodiment, blocks 216-222 represent operations for initializing a virtual TPM for a virtual machine. For instance, in response to a request for creation of virtual machine 110A, virtual TPM service 104 may use TPM 30 to create a storage key called vEK 64, as indicated at block 216. Further, virtual TPM service 104 may use TPM 30 to bind vEK 64 to the PCR values for virtual TPM service 104 and the boot environment that virtual TPM service 104 resides in. Initial authorization data for vEK 64 may also be created and stored in vTPM 120A.

At block 218, virtual TPM service 104 uses CK 56 to certify vEK 64. For instance, virtual TPM service 104 may use the TPM_CertifyKey function of TPM 30 to certify vEK 64 and to obtain certification information, such as a TPM_CERTIFY_INFO structure, for vEK 64. In the example embodiment, this certification information for vEK 64 is signed by CK 56, and contains the PCR information vEK 64 is bound to (e.g., information for PCRs 32). This process may guarantee that vEK 64 is stored in a hardware TPM that is approved by privacy CA 76. In the example embodiment, since privacy CA 76 has signed CK credential 58, the certification by CK 56 of the PCR bindings of vEK 64 will be trusted as though privacy CA 76 has indicated that vEK 64 is in a hwTPM that is considered good according to TCG standards.

At block 220, virtual TPM service 104 may transmit a vTPM EK credential request to a third party or TTP called a virtualization CA 78. That credential request may include CK credentials 58 and the certification information for vEK 64 signed by CK 56.

Virtualization CA 78 may be a certificate authority that is trusted by the privacy CA. Virtualization CA 78 may be viewed, in general, as another manufacturer of TPMs. In the example embodiment, virtualization CA 78 is vTPM aware, and is capable of differentiating approved or "safe" virtual TPM environments from unapproved or "unsafe" virtual TPM environments. In one embodiment, virtualization CA 78 is the only entity outside of processing system 20 that must be aware of the existence of TPM virtualization for effective TPM virtualization.

After virtualization CA 78 evaluates CK credentials 58 and the certification information for vEK 64, including the PCR bindings, if the request is approved, virtualization CA 78 will return a signed vEK credential 60 to processing system 20. In the example embodiment, vEK credential 60 includes a model field with data indicating that vEK 64 is associated with a virtual TPM running in an identifiable environment. At block 222 virtual TPM service 104 may receive the signed vEK credential 60.

The above process may thus establish the following chain of trust: CK credential 58 is a credential signed by privacy CA 76 to indicate that CK 56 is a legitimate AIK within a legitimate TPM. The certification information for vEK 64 indicates that, according to CK 56, vEK 64 is a key bound to a particular set of PCRs and housed in the same legitimate TPM. Since privacy CA 76 created CK credentials 58, virtualization CA 78 trusts the certification information for vEK 64 created by CK 56. If virtualization CA 78 approves of the vTPM environment the EK is bound to, it will therefore be willing to produce an endorsement credential for vEK 64 to indicate that vEK 64 represents a valid TPM. Further, in vEK credential 60, virtualization CA 78 may include model information to indicate that this TPM is virtual and can be trusted at the discretion of the remote challenger during attestation.

Blocks 224-226 represent additional operations for initializing vTPM. In one embodiment, to perform these operations, virtual TPM service 104 uses standard functions to initialize vTPM 120A, as if vTPM 120A were a hwTPM. For instance, virtual TPM service 104 may call TPM_Get_PUBEK to get the public portion of vEK 64, and may call TPM_TakeOwnership to create vSRK 66, as depicted at blocks 224 and 226, respectively. In the example embodiment, virtual TPM service 104 binds vSRK to the same PCRs as vEK 64 (i.e., PCRs 32). Virtual TPM service 104 may provide the authorizations to vTPM 120A in a form encrypted with the public portion of vEK 64. These authorizations may then be decrypted by vTPM 120A using vEK 64. In the example embodiment, the legacy key vEK 64 is used to decrypt the authorizations, since they are not TPM_BOUND_DATA.

In the example embodiment, the authorization data for vEK 64 is changed from that stored in vTPM 120A during creation of vEK 64 to that provided in the TPM_TakeOwnership call.

VM 110A may then use vTPM 120A as if vTPM 120A were a hwTPM, as depicted at block 228 and as described in greater detail below with regard to FIG. 4. As shown at block 240, virtual TPM service 104 may then determine whether a new VM is being created requiring a new vTPM. If so, the process may return to block 216, with operations performed to instantiate the new vTPM as described above, for example, with a new vEK being created for the new VM, etc. If a new VM is not being created, virtual TPM service 104 may continue using TPM 30 to provide vTPM 120A for VM 110A.

Figure 4:
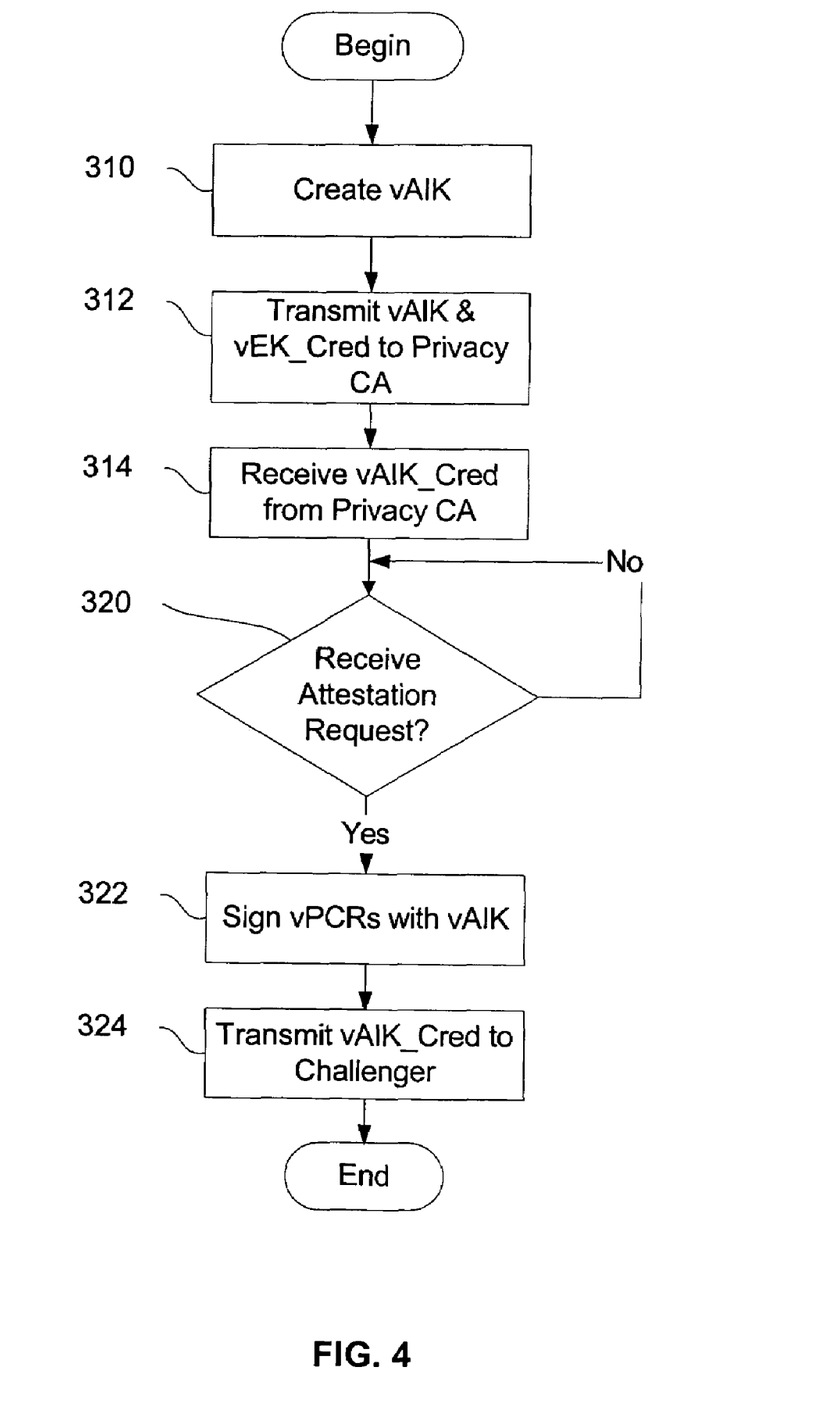
FIG. 4 is a flowchart illustrating a process for utilizing a virtual TPM, in accordance with one embodiment of the present invention.

FIG. 4 is a flowchart illustrating an example embodiment of a process to utilize a virtual TPM, such as vTPM 120A. The illustrated process provides more detail concerning some of the operations summarized at block 228 of FIG. 3. For instance, blocks 310-314 depict operations for creating a vAIK for VM 110A, in which VM 110A uses vTPM 120A as though vTPM 120A were a hwTPM. Virtual TPM 120A may create vAIK 70 in TPM 30, and may create the normal documents a hardware TPM would typically create for an AIK.

For example, at block 310, VM 110A creates a vAIK in vTPM 120A by calling TPM_MakeIdentity. In response to that call, vTPM 120A instructs TPM 30 to create a new TCG_SIGNING_KEY key within TPM 30. That signing key, which will serve as the new virtual attestation identity key, is depicted in FIG. 1 as vAIK 70. Thus, from the perspective of the hwTPM, a virtual AIK may not be of key type "AIK," but may be a signing key. However, to the world outside of the hwTPM, the virtual AIK may serve as, and appear to be, of key type "AIK."

TCG_IDENTITY_CONTENTS for vAIK 70 are then created by vTPM 120A and TSS 108A. TSS 108A may then execute TSS_CollateIdentityRequest to create a TCG_IDENTITY_REQ. This call may be made as usual, except that the EK credential used will be vEK credential 60, rather than an EK credential for a hwTPM.

As depicted at block 312, TSS 108A may then send that request, which includes documents such as vAIK 70 and vEK credentials 60, to privacy CA 76. Privacy CA 76 will examine the documents. Furthermore, privacy CA 76 may be unaware of TPM virtualization, and may trust the vEK endorsement credential 60 from virtualization CA 78 as it would any other TPM manufacturer's credentials. After verifying the documents, privacy CA 76 will create a new identity credential 62 for vAIK 70, sign that credential, and send it to processing system 20. Accordingly, TSS 108A may receive vAIK credential 62 from privacy CA 76, as shown at block 314.

Next, blocks 320-324 depict example operations for handling attestation requests. At block 320, vTPM 120A determines whether a command received requires attestation as to the trustworthiness of VM 110A. When such a request is received, TSS 108A may use vTPM 120A to quote vPCRs 92, and may use vAIK 70 to sign the PCR quotation, as shown at block 322. As indicated at block 324, when VM 110A is challenged by a remote entity, TSS 108A may transmit vAIK credential 62 to the remote entity as if vAIK 70 were in a hwTPM.

According to one embodiment, if the challenger is vTPM-aware, it will be able to look at the model information, discover that the TPM used by VM 110A is a vTPM, and decide whether or not the underlying platform should be trusted. The model information may uniquely identify the underlying platform configuration.

If the challenger trusts the underlying platform, the challenger will know that privacy CA 76 claims the following: the vTPM is rooted in a hardware TPM, the vTPM is only available for use in the hardware TPM. If the challenger does not trust the particular configuration of the vTPM, the challenger can choose to reject the transaction. Moreover, if the challenger is a legacy application unaware of vTPMs, the challenger will be able to use standard TPM protocols to conclude the attestation, simply based on a trust determination for the signature of privacy CA 76.

In a like manner, vTPM 120A may provide all other functionalities for a VM that a conventional hardware TPM can provide for a monolithic system.

The disclosed embodiment or embodiments thus allow multiple VMs to use TPM functionality without requiring multiple dedicated hardware TPMs, without requiring modification to the software within a VM, and without requiring modification to remote entities that interact with a subject system. According to the present disclosure, a virtual TPM can measure the OS and applications in a VM to provide attestation to remote entities. Moreover, a virtual TPM can attest to a virtual machine's state for a hardware TPM challenger, even though the hardware TPM and the challenger may utilize only the functionality described in the current TPM specifications, such as the TPM Version 1.2 Design Specification referenced above. The guest OS in a virtual machine may remain unaware that a hardware TPM is being shared, and trust relationships are not required between the VMs within a system.

As illustrated in FIG. 1, zero or more vSigs 68, zero or more vAIKs 70, and zero or more vEncs 72 may be created for each vTPM. As describe above, virtual keys such as vSigs 68, vEncs 72, etc. can be created and stored in the hwTPM in one embodiment. Consequently, a vTPM can store and create its keys in such a way that a compromise of a virtual TPM does not permanently compromise the keys that were stored in the vTPM.

Alternatively, for increased flexibility and/or performance, the virtual keys can be created and used by the vTPM software. For example, the virtual keys may not be stored in or directly protected by the hwTPM. Private keys belonging to or generated by the virtual TPM may not be operated on by the hardware TPM, in that the hardware TPM may not use those private keys to perform cryptographic operations. Instead, the virtual TPM may use the host processor and cryptographic software to perform cryptographic operations with its private keys. To do this, the virtual TPM service may store its private keys in protected host memory. However, while the private key is not in use, the virtual TPM service may use hardware TPM features to wrap the key to its software configuration.

These options may allow the vTPM to encrypt, decrypt, sign, and verify objects in the vTPM software with much higher performance than may be provided by a hardware TPM. These options may thus be preferred for bulk encryption or use in performance-sensitive server environments, for instance. However, a tradeoff for added performance is that virtual keys may be permanently compromised if a vTPM is compromised.

In light of the principles and example embodiments described and illustrated herein, it will be recognized that the illustrated embodiments can be modified in arrangement and detail without departing from such principles. For example, virtual TPMs have been described in connection with virtual machines, but alternative embodiments also include vTPMs used in connection with other types of system subdivisions, such as partitions within a server or group of servers that share a hardware TPM. For instance, virtual TPMs may be used in a four processor system that is partitioned into two logical two-processor systems). The teachings herein could also be used to provide a logical TPM to one or more service coprocessors, or to one or more other types of independent processing elements on a hardware platform.

Furthermore, alternative embodiments include vTPM services that do not emulate a hardware TPM, but do extend and/or amplify the capabilities of a hardware TPM (e.g., by providing more PCRs, more storage, etc.). Alternative embodiments also include a virtual TPM service running on top of a secure OS, on top of a managed run-time environment (MRTE), in a service processor or coprocessor, in a system management mode (SMM) of a platform, etc.

Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; as well as communications media such antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method comprising:
    creating a virtual trusted platform module (TPM) for use in a processing system that contains a physical TPM;
    storing a key for the virtual TPM in the physical TPM; and
    using the virtual TPM to provide emulated physical TPM features to a user during a first authorization session between the virtual TPM and the user when the virtual TPM can perform a requested function, and otherwise using the physical TPM to perform the requested function during a second authorization session between the virtual TPM and the physical TPM.

2. A method according to claim 1, further comprising:
    creating virtual platform configuration registers (PCRs) in a memory space of the virtual TPM; and
    emulating at least one standard PCR operation, using the virtual PCRs, wherein the at least one standard PCR operation to be emulated comprises one or more operations selected from the group consisting of:
    a PCR read operation to obtain data from one of the virtual PCRs; and
    a PCR extend operation to update data within one of the virtual PCRs.

3. A method according to claim 1, wherein the operation of using the virtual TPM to provide emulated physical TPM features comprises:
    using the virtual TPM to emulate a hardware TPM for a virtual machine in the processing system.

4. A method according to claim 3, wherein the virtual TPM comprises a first virtual TPM and the virtual machine comprises a first virtual machine, the method further comprising:
    creating a second virtual TPM in the processing system;
    storing a key for the second virtual TPM in the physical TPM; and
    emulating a physical TPM for the second virtual machine, using the second virtual TPM.

5. A method according to claim 1, wherein the operation of storing a key for the virtual TPM in the physical TPM comprises storing at least one key selected from the group consisting of:
    an endorsement key (EK) for the virtual TPM; and
    a storage root key (SRK) for the virtual TPM.

6. A method according to claim 1, further comprising:
    generating an endorsement key (EK) for the virtual TPM, wherein the EK is bound to an environment for the virtual machine.

7. A method according to claim 6, further comprising:
    transmitting certification information for the EK to a certification authority; and
    obtaining an endorsement credential from the certification authority.

8. A method according to claim 6, further comprising:
    transmitting certification information for the EK to a virtualization certification authority (CA);
    obtaining an endorsement credential for the virtual TPM from the virtualization CA;
    transmitting the endorsement credential to a privacy CA; and
    receiving an identity credential from the privacy CA.

9. A method according to claim 1, wherein the operation of using the virtual TPM to provide emulated physical TPM features comprises:
    obtaining, from a privacy certification authority (CA), an identity credential for a virtual attestation identity key (AIK) associated with a virtual machine; and
    transmitting the identity credential to a challenger.

10. The method of claim 1, wherein the first authorization session and the second authorization session are of a single user session.

11. The method of claim 10, wherein the virtual TPM transparently provides the emulated physical TPM features transparently under the single user session from the virtual TPM and the physical TPM.

12. An apparatus comprising:
    a machine accessible medium; and
    instructions stored on the machine accessible medium, wherein the instructions, when executed by a processing system with a hardware TPM, cause the processing system to perform operations comprising:
    creating a virtual trusted platform module (TPM);
    storing a key for the virtual TPM in the hardware TPM; and
    using the virtual TPM to provide emulated physical TPM feature, including handling an attestation request from a challenger by transmission of a credential to the challenger, wherein the challenger is to determine attestation based at least in part on reading of model information of the credential that uniquely identifies a platform configuration of the apparatus and indicates presence of the virtual TPM if the challenger is virtual TPM-aware, and otherwise the challenger is to determine attestation based on a trust determination for a signature of a privacy certification authority.

13. An apparatus according to claim 12, wherein the virtual TPM comprises a first virtual TPM, and the operations performed by the instructions further comprise:
    creating second virtual TPM in the processing system; and
    storing a key for the second virtual TPM in the hardware TPM.

14. An apparatus according to claim 12, wherein the operation of using the virtual TPM to provide emulated physical TPM features comprises:
    obtaining, from a privacy certification authority (CA), an identity credential for a virtual attestation identity key (AIK); and
    transmitting the identity credential to a challenger.

15. An apparatus according to claim 12, wherein the operation of using the virtual TPM to provide emulated physical TPM features comprises:
    using the virtual TPM to emulate a hardware TPM for a virtual machine in the processing system.

16. A processing system comprising:
    a processor;
    a trusted platform module (TPM) communicatively coupled to the processor;

an endorsement key (EK) stored in the TPM, along with a certifying key and a certifying key credential obtained from a privacy certification authority;
a virtual machine (VM) executing on the processor;
a virtual TPM associated with the VM; and
a virtual endorsement key (EK) associated with the VM, the virtual EK based on the EK stored in the TPM and a virtual EK credential obtained from a virtualization certification authority, the virtual EK credential including a model field to indicate that the virtual EK is associated with the virtual TPM operating in an identifiable environment.

17. A processing system according to claim 16, further comprising:
a virtual TPM service executing on the processor, wherein the virtual TPM service uses the TPM to create the virtual TPM for the VM.

18. The processing system of claim 16, wherein a challenger is to trust the processing system after an attestation in which the challenger reads the model field to indicate presence of the virtual TPM, wherein the challenger is virtual TPM aware.

19. A processing system comprising:
a processor;
a physical trusted platform module (TPM) communicatively coupled to the processor;
a machine accessible medium communicatively coupled to the processor; and
instructions to implement a virtual TPM service encoded in the machine accessible medium, wherein the virtual TPM service performs operations comprising:
creating a virtual trusted platform module (TPM);
storing a key for the virtual TPM in the physical TPM; and
using the virtual TPM to provide emulated physical TPM features to a user during a first authorization session between the virtual TPM and the user when the virtual TPM can perform a requested function, and otherwise using the physical TPM to perform the requested function during a second authorization session between the virtual TPM and the physical TPM.

20. An apparatus according to claim 19, wherein:
the processing system comprises multiple processors in one or more servers; and
the operation of using the virtual TPM to provide emulated physical TPM features comprises:
providing a first virtual TPM to a first partition in the processing system; and
providing a second virtual TPM to a second partition in the processing system.

21. An apparatus according to claim 19, wherein the operation of using the virtual TPM to provide emulated physical TPM features comprises:
providing a logical TPM to one or more service coprocessors.

* * * * *